US010794407B2

(12) United States Patent
Simonneaux

(10) Patent No.: US 10,794,407 B2
(45) Date of Patent: Oct. 6, 2020

(54) CENTRE SEEKING ACTUATOR

(71) Applicant: Safran Landing Systems UK LTD, Gloucester (GB)

(72) Inventor: Yann Simonneaux, Gloucester (GB)

(73) Assignee: Safran Landing Systems UK LTD (GB)

( * ) Notice: Subject to any disclaimer, the term of this patent is extended or adjusted under 35 U.S.C. 154(b) by 257 days.

(21) Appl. No.: 15/834,800

(22) Filed: Dec. 7, 2017

(65) Prior Publication Data

US 2018/0172035 A1 Jun. 21, 2018

(30) Foreign Application Priority Data

Dec. 19, 2016 (EP) .................................. 16205169

(51) Int. Cl.
| | |
|---|---|
| *F15B 15/14* | (2006.01) |
| *B64C 25/58* | (2006.01) |
| *F16F 9/36* | (2006.01) |
| *B64C 25/22* | (2006.01) |
| *B64C 25/60* | (2006.01) |
| *F16F 9/06* | (2006.01) |
| *B64C 25/34* | (2006.01) |

(52) U.S. Cl.
CPC .......... *F15B 15/1461* (2013.01); *B64C 25/58* (2013.01); *F15B 15/1438* (2013.01); *F15B 15/1476* (2013.01); *F16F 9/36* (2013.01); *B64C 25/22* (2013.01); *B64C 25/60* (2013.01); *B64C 2025/345* (2013.01); *F16F 9/06* (2013.01)

(58) Field of Classification Search
CPC ... F15B 15/1461; F15B 15/1438; B64C 25/58

USPC ................................................ 92/165 R, 143
See application file for complete search history.

(56) References Cited

U.S. PATENT DOCUMENTS

| | | | | |
|---|---|---|---|---|
| 3,631,760 A * | 1/1972 | Moran | .................. | F15B 11/076 91/402 |
| 7,448,310 B2 * | 11/2008 | Atkinson | .............. | F15B 11/036 92/110 |
| 2007/0272077 A1 | 11/2007 | Perkins | | |
| 2011/0133544 A1 * | 6/2011 | Ruopp | ..................... | B60T 7/02 303/9.61 |

(Continued)

FOREIGN PATENT DOCUMENTS

| | | |
|---|---|---|
| DE | 202009012284 U1 | 1/2010 |
| GB | 679060 | 9/1952 |

(Continued)

OTHER PUBLICATIONS

Extended European Search Report for European Application No. 16205169.2-1754, dated Jun. 14, 2017—8 Pages.

*Primary Examiner* — Nathaniel E Wiehe
*Assistant Examiner* — Richard C Drake
(74) *Attorney, Agent, or Firm* — RatnerPrestia

(57) ABSTRACT

A centre seeking actuator having an outer cylinder, a slave cylinder slidably disposed within the outer cylinder, and a rod assembly having a piston slidably disposed within the slave cylinder and a rod extending from the piston to a point outside the outer cylinder. One or more first dynamic seals are arranged to act on a side wall of the rod to inhibit working fluid leaking from the outer cylinder, and one or more second dynamic seals are arranged to act on a sidewall of the slave cylinder to inhibit working fluid leaking from the outer cylinder.

16 Claims, 6 Drawing Sheets

(56) References Cited

U.S. PATENT DOCUMENTS

| | | | | |
|---|---|---|---|---|
| 2012/0110994 | A1* | 5/2012 | Chen | B60T 11/232 |
| | | | | 60/533 |
| 2013/0052361 | A1* | 2/2013 | Croopnick | C22C 45/02 |
| | | | | 427/456 |
| 2013/0233968 | A1* | 9/2013 | Goodburn | B64C 25/34 |
| | | | | 244/102 A |
| 2014/0041221 | A1* | 2/2014 | Auguste | B60T 11/232 |
| | | | | 29/888.02 |
| 2014/0319903 | A1* | 10/2014 | Murayama | B60T 8/368 |
| | | | | 303/15 |
| 2015/0159753 | A1* | 6/2015 | Mueller | F15B 15/1438 |
| | | | | 92/165 R |
| 2015/0175142 | A1* | 6/2015 | Lopez-Larequi | B60T 11/236 |
| | | | | 60/533 |
| 2015/0322559 | A1* | 11/2015 | Killian | C23C 4/06 |
| | | | | 428/380 |
| 2016/0076561 | A1* | 3/2016 | Green | B64C 25/60 |
| | | | | 92/143 |
| 2019/0144105 | A1* | 5/2019 | Sharpe | B64C 25/62 |

FOREIGN PATENT DOCUMENTS

| | | |
|---|---|---|
| GB | 2428650 A | 2/2007 |
| GB | 2510208 A | 7/2014 |

\* cited by examiner

CENTRE SEEKING ACTUATOR

This application claims the benefit of and priority to European Application EP 16205169.2, filed on Dec. 19, 2016, the contents of which are incorporated herein by reference.

BACKGROUND

A known class of actuator is arranged so as to be biased to assume an intermediate condition which lies between a compressed condition and an extended condition in terms of the extension state of the actuator. Such actuators will be referred to herein as "centre seeking".

A centre seeking actuator can be used to bias a first part of an assembly to move to a predetermined position relative to a second part of the assembly and oppose relative movement from the predetermined position. Once such example is an aircraft landing gear 'pitch trimming' actuator which is arranged to bias a bogie beam to adopt a predetermined orientation relative to a main strut and still allow the bogie beam to rotate in two directions.

A centre seeking actuator contains pressurised fluid which acts on internal surfaces of the actuator such that a pressure differential causes the actuator to adopt the intermediate condition. A centre seeking actuator will therefore oppose an applied force which acts to move the actuator from the intermediate condition.

The pressurised fluid can be provided by an external supply, such as a vehicle hydraulic supply. Alternatively, a centre seeking actuator can be self-contained, where the working fluid comprises a liquid and a compressible gas, the liquid being pressurised by the gas.

In both cases dynamic seals are provided to inhibit the flow of working fluid from the actuator.

The present inventor has identified that known centre seeking actuators can be improved to reduce the likelihood of working fluid leakage.

SUMMARY

According to a first aspect of the invention, there is provided a centre seeking actuator comprising:
an outer cylinder;
a slave cylinder slidably disposed within the outer cylinder;
a rod assembly, the piston of which is slidably disposed within the slave cylinder and the rod of which extends from the outer cylinder;
one or more first dynamic seals arranged to act on a sidewall of the rod to inhibit working fluid leaking from the outer cylinder; and
one or more second dynamic seals arranged to act on a sidewall of the slave cylinder to inhibit working fluid leaking from the outer cylinder.

Thus, the centre seeking actuator according to the first aspect has second dynamic seals which act against the outside sidewall of the slave cylinder, rather than the inner sidewall of the outer cylinder as per prior art arrangements. This arrangement can provide an advantage over prior art centre seeking actuators in that an improved the surface finish can be created on the outside sidewall of the slave cylinder in comparison to a surface finish that can be created on the inner sidewall of the outer cylinder. Thus, seal abrasion and therefore oil leakage may be reduced in comparison to prior art arrangements.

At least some of the sidewall of the slave cylinder that in use comes into contact with the second dynamic seals can be provided with a coating. Advantageously, a more uniform coating can be provided in a more repeatable manner on the outside sidewall of the slave cylinder in comparison to a coating that can be created on the inner sidewall of the outer cylinder.

The coating can comprise a high velocity oxygen fuel (HVOF) coating comprising metal, metal alloy, ceramic, plastic or composite materials. In one example, the HVOF coating can comprise chrome or tungsten carbide.

Alternatively, the second dynamic seals can be arranged to act on a bare sidewall of the slave cylinder. Advantageously, a more uniform machining profile can be provided in a more repeatable manner on the outside sidewall of the slave cylinder in comparison to that which can be created on the inner sidewall of the outer cylinder.

The outer cylinder can have a length and the one or more second dynamic seals can be located closer to the middle of the outer cylinder than to either end of it.

The outer cylinder can comprise a first axial face and a second axial face connected by one or more first sidewalls to define a primary chamber, the first axial face having a first through-hole. Thus, the outer cylinder may define an inner volume within which a slave cylinder is slidably disposed so as to be movable relative to the outer cylinder.

The slave cylinder can be slidably disposed within the primary chamber, the slave cylinder comprising a third axial face and a fourth axial face connected by one or more second sidewalls to define a slave cylinder chamber, the third axial face having a second through-hole, the slave cylinder being constrained to move only between first and second extremities within the primary chamber so as to leave at least one free portion of the primary chamber, the outer cylinder including a venting port in fluid communication with the free portion of the primary chamber.

The piston of the piston and rod assembly can be slidably disposed within the slave cylinder chamber and the rod of which can extend though the second and first through-holes so as to project a free end from the outer cylinder.

The one or more first dynamic seals can be mounted at or adjacent to the first through hole and arranged to act on an external surface of the rod to inhibit working fluid within the chamber passing though the firsts through-hole. The one or more second dynamic seals can be mounted on the one or more first sidewalls of the outer cylinder and arranged to act on an external surface of the one or more second sidewalls of the slave cylinder to inhibit working fluid within the chamber passing to the free portion of the primary chamber.

The actuator can be arranged to be movable between an extended condition and a compressed condition and being biased to an intermediate condition between and distinct from the extended condition and the compressed condition. In embodiments of the invention the intermediate condition may be anywhere between but distinct from the extended and compressed conditions. In some embodiments the intermediate condition may be generally mid-way between the extended and compressed conditions. The actuator may be biased towards the intermediate condition from both contracted and extended conditions.

Thus, according to an aspect of the invention, there is provided a centre seeking actuator arranged to be movable between an extended condition and a compressed condition and being biased to an intermediate condition between and distinct from the extended condition and the compressed condition, the actuator comprising:

an outer cylinder comprising a first axial face and a second axial face connected by one or more first sidewalls to define a primary chamber, the first axial face having a first through-hole;

a slave cylinder slidably disposed within the primary chamber, the slave cylinder comprising a third axial face and a fourth axial face connected by one or more second sidewalls to define a slave cylinder chamber, the third axial face having a second through-hole, the slave cylinder being constrained to move between first and second extremities within the primary chamber so as to leave at least one free portion of the primary chamber, the outer cylinder including a venting port in fluid communication with the free portion of the primary chamber;

a rod assembly, the piston of which is slidably disposed within the slave cylinder chamber and the rod of which extends though the second and first through-holes so as to project a free end from the outer cylinder;

one or more first dynamic seals mounted at or adjacent to the first through hole and arranged to act on an external surface of the rod to inhibit working fluid within the chamber passing though the firsts through-hole; and one or more second dynamic seals mounted on the one or more first sidewalls of the outer cylinder and arranged to act on an external surface of the one or more second sidewalls of the slave cylinder to inhibit working fluid within the chamber passing to the free portion of the primary chamber.

The actuator can be provided with end stops arranged to define the first and second extremities to which the slave cylinder can move. The end stops can comprise abutment formations or snubbing valves.

The actuator can be arranged such that the venting port is in fluid communication with the free portion of the chamber while the slave cylinder moves between the first and second extremities. This can for example be achieved by locating the end stops such that the slave cylinder cannot move to a position in which it seals the venting port, and in some embodiments a pressurisation port. Alternatively, one or more relief channels can be provided to provide fluid communication even when the slave cylinder is in parallel with the port.

According to a further aspect of the invention there is provided an assembly including an actuator according to the first aspect arranged to bias a first part of the assembly to assume a predetermined position relative to the second part, the assembly being arranged, in use, to force the actuator to assume the first condition when in a first state and having a second state in which the actuator moves the first part of the assembly to assume the predetermined position relative to the second part.

The assembly may be an aircraft assembly, such as an aircraft landing gear assembly.

The first part may be a bogie beam. The second part may be a main strut, such as main fitting or a sliding tube of a shock absorbing strut.

BRIEF DESCRIPTION OF THE DRAWINGS

Embodiments of the invention will now be described with reference to the accompanying drawings, in which.

DETAILED DESCRIPTION

Figure 1:
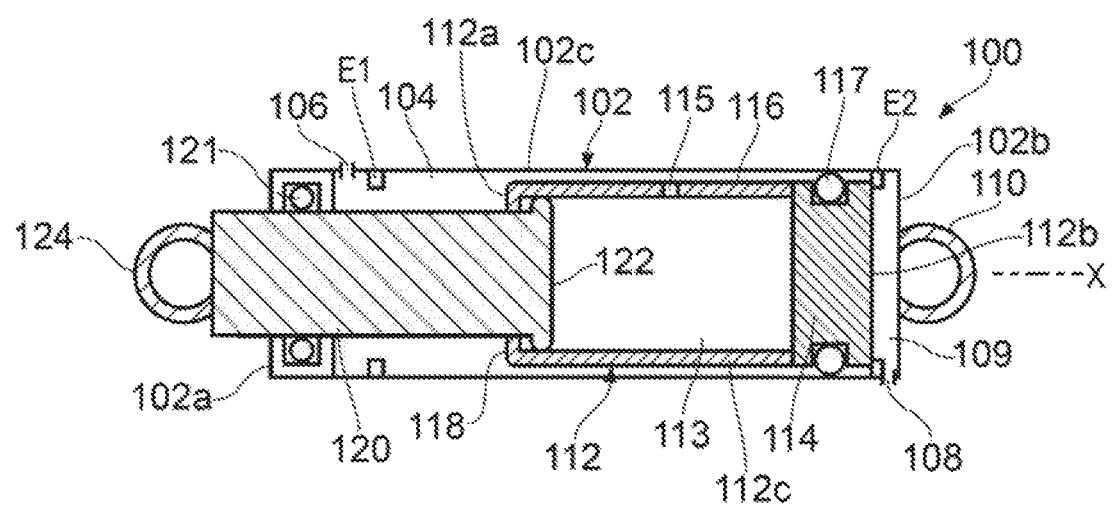
FIG. 1 is a diagram of a prior art actuator.

FIG. 1 is a longitudinal cross section view of a known centre seeking actuator 100. The actuator 100 is a "single acting" actuator i.e. when operated it moves to assume the intermediate condition, but is not arranged to be actuated to the compressed or extended conditions.

The actuator 100 includes an outer cylinder 102 defining an inner volume that is generally partitioned by a slave cylinder 112 into a gas chamber 109 and a primary chamber 104 for containing hydraulic or working fluid. The outer cylinder 102 has a first axial face 102a and a second axial face 102b connected by one or more first sidewalls 102c to define the primary chamber 104. The first axial face 102a has a first through-hole. The outer cylinder 102 defines a first coupling region 110.

The gas chamber 109 is vented to atmosphere via a venting port 108, which can be formed in the second axial face 102b or the first sidewalls 102c.

The slave cylinder 112 comprises a third axial face 112a and a fourth axial face 112b connected by one or more second sidewalls 112c to define a slave cylinder chamber 113. The third axial face 112a has a second through-hole. The slave cylinder 112 is slidably housed within the inner volume to move along an axis X between predefined end points or extremities defined by end stops E1, E2 which can for example be defined by abutment formations or lockup valves within the outer cylinder 102. The venting port 108 is sufficiently open throughout movement of the slave cylinder 112 to provide pressure equalisation between the gas chamber 109 and atmosphere.

The outer cylinder 102 includes a hydraulic fluid port 106 on the opposite side of the slave cylinder 112 to the venting port 108. The hydraulic fluid port 106 is arranged to be coupled to a hydraulic fluid circuit. The hydraulic fluid port 106 is sufficiently open throughout movement of the slave cylinder 112 to enable fluid to be supplied to the primary chamber 104.

A first dynamic seal 117 is provided between the slave cylinder 112 and outer cylinder 102 to inhibit hydraulic fluid passing to the gas side 108. The seal can be mounted on a gland nut arranged to be screwed into the aperture in the axial face of the outer cylinder 102. A plurality of first dynamic seals can be provided in parallel with one another.

The slave cylinder 112 defines a slave cylinder chamber 113 within which a rod assembly 120, 122 is slidably housed to move along the axis X. The piston 122 is slidably disposed within the slave cylinder chamber 113 and free to move along it. The piston rod 120 extends though the second and first through-holes so as to project from the outer cylinder 102. The free end of the piston rod 120 defines the second connector 124.

A second dynamic seal 121 is provided between the piston rod 120 and outer cylinder 102 within the aperture formed through the axial face of the outer cylinder 102, to inhibit hydraulic fluid from passing out of the outer cylinder 102 via the aperture. A plurality of second dynamic seals can be provided in parallel with one another.

The slave cylinder 112 includes one or more control apertures 115 arranged to enable fluid communication between the hydraulic fluid chamber 104 and the slave cylinder chamber 113.

In use, pressurised hydraulic fluid enters the hydraulic fluid port 106 and forces the slave cylinder 112 to an end stop adjacent to the venting port 108, as well as passing through the control apertures 115 into the slave cylinder chamber 113 and in doing so forcing the piston rod 120 to extend outwardly with respect to the outer cylinder 102. Thus, the actuator 100 is continually biased to an intermediate condition between and distinct from the fully extended condition and the fully compressed condition, and therefore can act as a shock absorber.

A dominant tensile force applied to the coupling regions 110, 124 results in the slave cylinder 112 being drawn away from the end stop adjacent the venting port 108 against the spring force provided by the pressurised hydraulic fluid within the outer cylinder 102. Thus, the actuator 100 can be forced to move to a fully extended condition. Upon the applied tensile force becoming inferior to the biasing force provided by the hydraulic fluid, the actuator 100 moves towards and assumes the intermediate condition.

A dominant compressive force applied to the coupling regions 110, 124 results in the piston 122 of the piston rod 120 moving towards the piston 114 of the slave cylinder 112 against the spring force provided by the pressurised hydraulic fluid within the outer cylinder 113. Upon the applied compressive force becoming inferior to the biasing force provided by the hydraulic fluid, the actuator 100 moves towards and assumes the intermediate condition.

The present inventor has identified that the second dynamic seals 117 can be prone to leakage due to the fact that they are arranged to act against a counter-face which is defined by a bore, namely the inner surface of the outer cylinder sidewall 102c. It is technically challenging to machine and/or apply a uniform coating to a bore surface in order to provide a fine surface finish counter-face, due to the long and narrow bore profile. Consequently, the second dynamic seals 117 run against a bare metal surface. The inventor has identified that this can lead to premature wear, thereby resulting in premature oil leakage.

Figure 2:
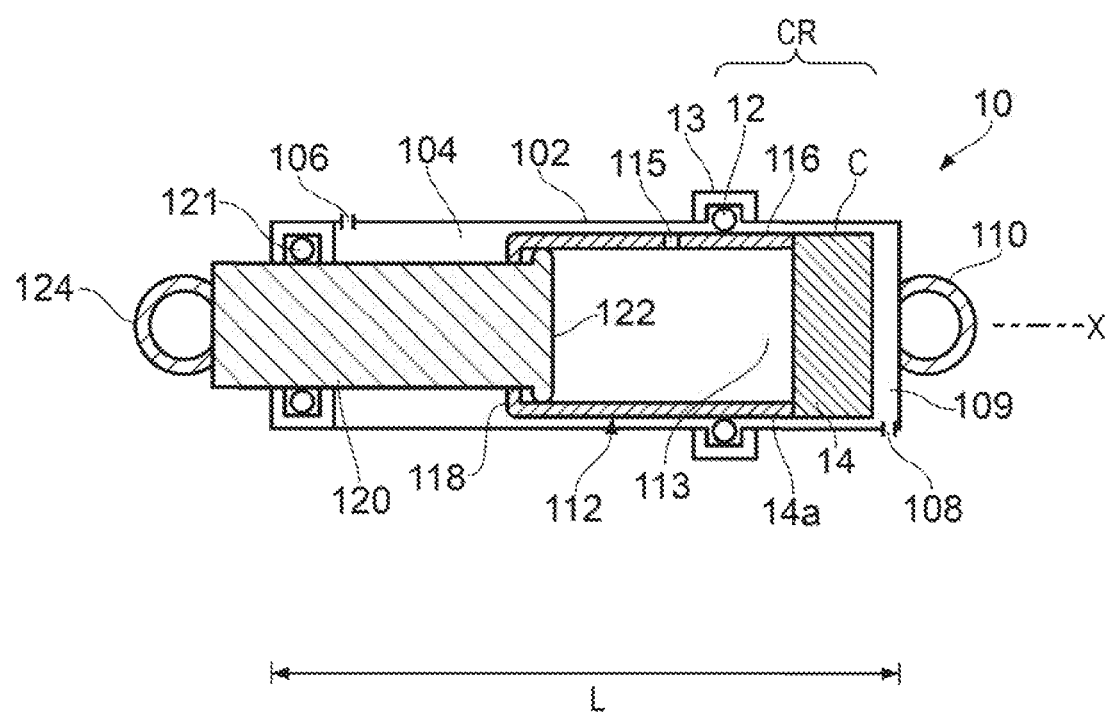
FIG. 2 is a diagram of an actuator according to an embodiment of the invention.

FIG. 2 shows an actuator 10 according to an embodiment of the present invention. The actuator 10 is similar to the known actuator 100 and therefore, for brevity, the following description will focus on the differences between the actuator 10 and the known actuator 100. Like parts have been give the same reference numerals. For clarity purposes, the end stops E1 and E2 are not shown.

The one or more second dynamic seals 12 in an actuator according to embodiments of the invention are mounted on an inner wall of the outer cylinder 102 so as to sealing engage the exterior sidewall 14a of the slave cylinder 14. The seals 12 can be mounted in any suitable manner, such as within a reinforced mounting formation 13. The outer cylinder 102 has a length L, which can for example be at least 150 mm and the one or more second dynamic seals 12 are located closer to the middle of the outer cylinder 102 than to either end of it.

In use, as the actuator 10 is extended and compressed, a contract region CR of the slave cylinder exterior sidewall 14a will move in sliding engagement relative to the stationary second dynamic seals 12.

The contact region CR of the exterior sidewall 14a of the slave cylinder 14 is provided with a coating C that improves the dynamic sealing relationship with second dynamic seal 12. The exterior sidewall 14a of the slave cylinder 14 is analogous to the piston rod 120 in terms of ease of applying a coating to it.

In some embodiments just some of the contact region CR can be provided with a coating C and in other embodiments the entire slave cylinder exterior sidewall 14a can be provided with a coating C.

Any suitable coating C can be provided that reduces wear of the second dynamic seals 12 and/or exterior sidewall 14a of the slave cylinder 14 relative to the arrangement illustrated in FIG. 1. For example, the coating C can comprise a high velocity oxygen fuel (HVOF) or an electrolytic process coating comprising metal, metal alloy, ceramic, plastic or composite materials. In one example, the coating can comprise chrome or tungsten carbide.

The coating C can have a thickness of between 50 and 300 µm and in some cases between 75 and 150 µm.

Figure 3:
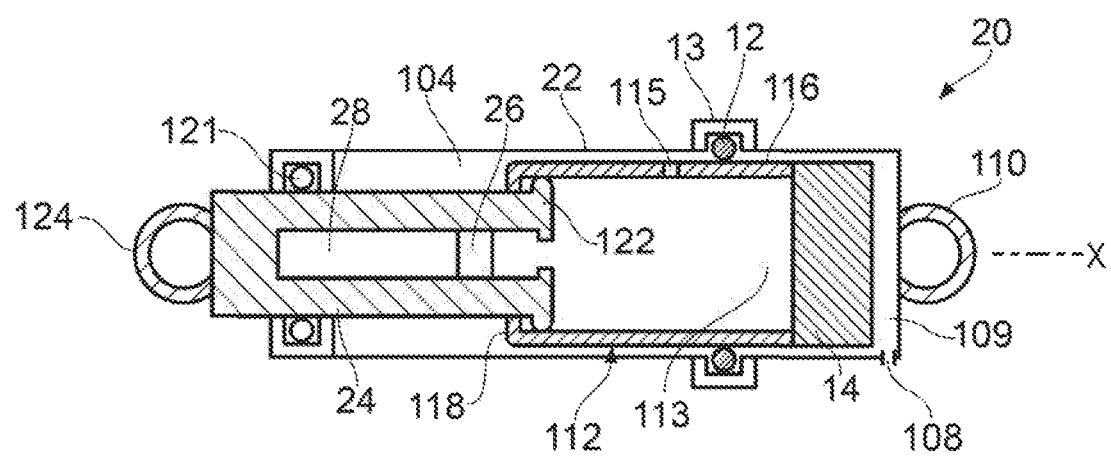
FIG. 3 is a diagram of an actuator according to a further embodiment of the invention.

FIG. 3 shows an actuator 20 according to a further embodiment of the present invention. The actuator 20 is similar to the actuator 10 of FIG. 2 and therefore, for brevity, the following description will focus on the differences between the actuator 20 and the known actuator 10. For clarity purposes, the end stops contact region CR and coating C are not shown.

The actuator 20 of this embodiment is self-contained in that it is not energised by an external supply. Therefore, the outer cylinder 22 does not include a fluid supply port. Instead, the piston rod 24 includes a blind hole separated by a second slave cylinder 26 into a separating piston 28 and the slave cylinder chamber 113. Gas, such as nitrogen, within the separating piston 28 forces the second slave cylinder 26 against fluid within the slave cylinder chamber 113 to bais the actuator 20 to its central position in a conventional manner. The gas can be compressed and expanded to permit the actuator to be compressed and expanded.

Figure 4:
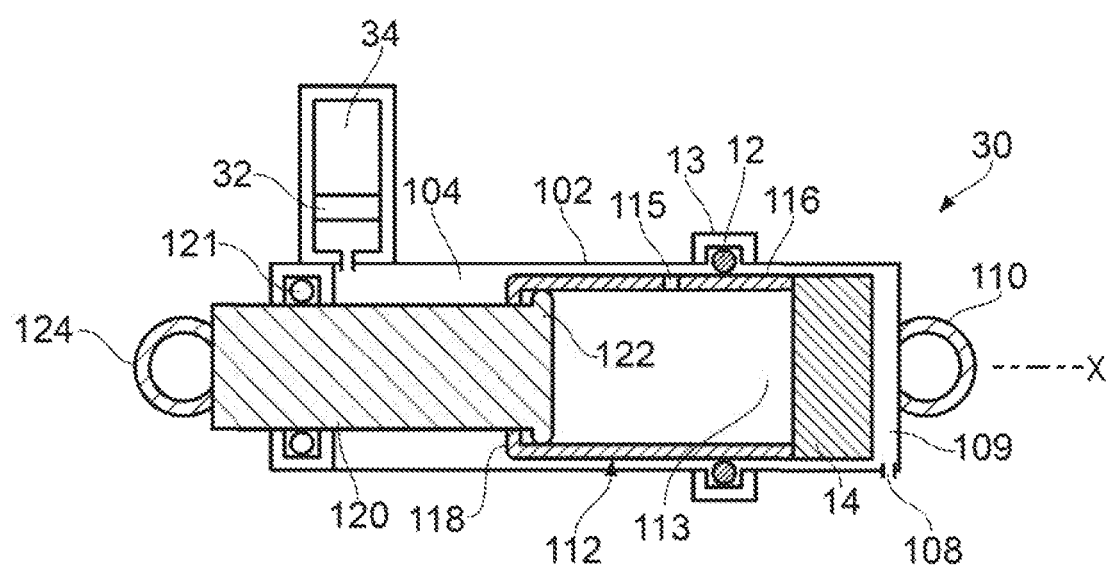
FIG. 4 is a diagram of an actuator according to a further embodiment of the invention.

FIG. 4 shows an actuator 30 according to a further embodiment of the present invention. The actuator 30 is similar to the actuator 20 of FIG. 3 and therefore, for brevity, the following description will focus on the differences between the actuator 30 and the known actuator 20.

The actuator of this embodiment includes an external cylinder connected to the outer cylinder 102 containing a separating piston 32 and second gas chamber 34 which functions analogously to the separating piston 26 and second gas chamber 28 of FIG. 3.

Figure 5:
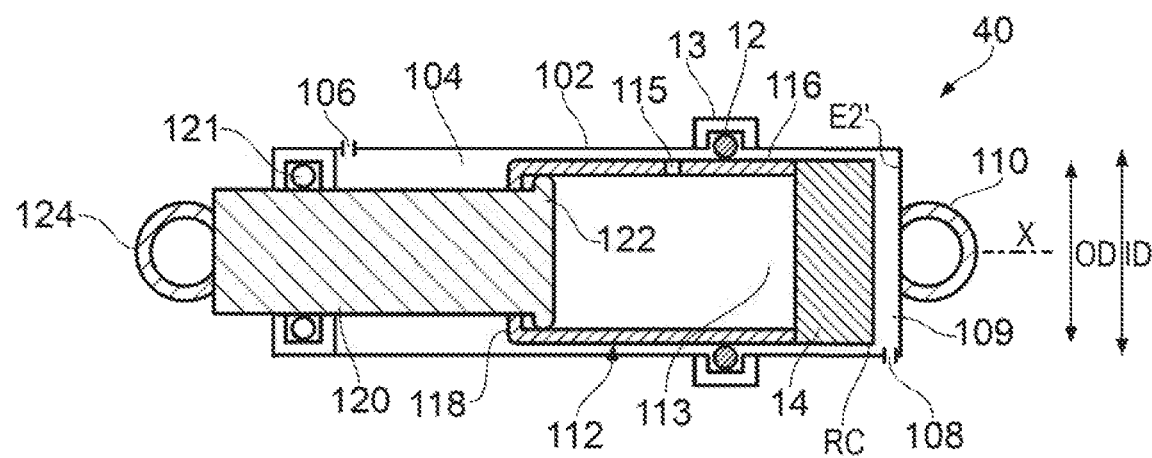
FIG. 5 is a diagram of an actuator according to a further embodiment of the invention.

FIG. 5 shows an actuator 40 according to a further embodiment of the present invention. The actuator 40 is similar to the actuator 10 of FIG. 2 and therefore, for brevity, the following description will focus on the differences between the actuator 40 and the known actuator 10.

The actuator of this embodiment includes a second end stop E2' which lies beyond the venting port 108 in terms of slave cylinder 14 travel. The inner diameter ID of the outer cylinder 102 is greater than the outer diameter OD of the slave cylinder 14 in at least the region of the venting port 108 so as to provide a relief channel RC between them which permits pressure equalisation within the venting chamber 109 throughout compression of the actuator 40.

Although the actuators described with reference to FIGS. 2 to 5 have coatings C applied to the slave cylinder sidewall 14a, in other embodiments the second dynamic seals 12 can be arranged to act on a bare sidewall of the slave cylinder. Advantageously, a more uniform machining profile can be provided in a more repeatable manner on the outside sidewall of the slave cylinder in comparison to that which can be created on the inner sidewall of the outer cylinder.

Figure 6:
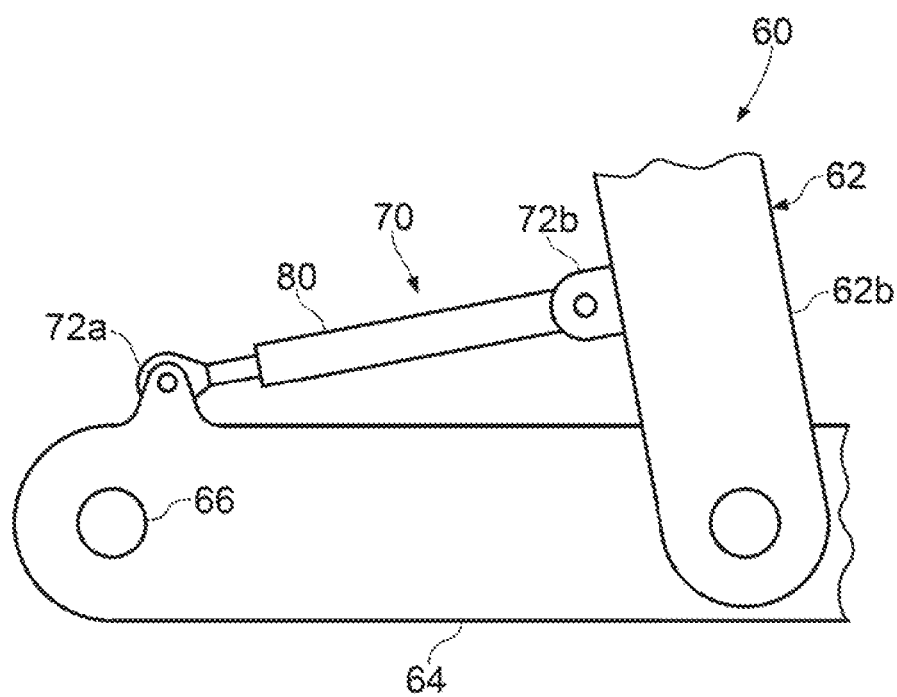
FIG. 6 is a diagram of an aircraft landing gear assembly according to an embodiment of the invention.

FIG. 6 shows a landing gear assembly 60 according to an embodiment of the present invention. The landing gear 60 includes a main strut 62, having an upper portion (not shown) arranged to be coupled to the underside of an aircraft (not shown) and a lower portion 62b telescopically mounted with respect to the upper portion. A bogie beam 64 is pivotally coupled to the lower portion of the main strut 62b, the bogie beam 64 having axles 66 mounted on it for carrying one or more wheel assemblies (not shown). A landing gear assembly according to embodiments of the present invention may have any suitable number of axles and wheels per axle.

A linkage 70 is pivotally coupled to the bogie beam 64 at a first coupling region 72a and pivotally coupled to the lower strut portion 62b at a second coupling region 72b. In the illustrated embodiment the linkage is defined by an actuator 80 according to an embodiment of the present invention, such as those described with reference to FIGS. 2 to 5. As will be appreciated, pivotal movement of the bogie beam 64 relative to the strut 62 results in a change in the condition i.e. the effective length of the actuator 80. The term "effective length" may refer to the distance between the pivot axis of first and second coupling regions 72a, 72b. Equally, a change in the effective length of the actuator 80 results in pivotal movement of the bogie beam 64 relative to the strut 62 and the actuator 80 can thus be used to "trim" the position of the bogie beam 64 for stowing. In alternative embodiments the coupling regions 72a, 72b could be reversed and may in other embodiments be coupled between any part of the bogie on the one hand and any part of the strut 62 on the other hand. In some embodiments the linkage 80 may include a multi bar linkage that is movable by an actuator so as to change the angular position of the bogie relative to the strut.

While the actuator 80 is described with reference to a landing gear assembly pitch trimming actuator, an assembly according to embodiments of the present invention may be any assembly including a central seeking actuator according to an embodiment of the invention arranged bias a first part of the assembly to assume a predetermined position relative to the second part, the assembly being arranged, in use, to force the actuator to assume the first condition when in a first state and having a second state in which the actuator moves the first part of the assembly to assume the predetermined position relative to the second part and where maintenance can be difficult and/or expensive; for example, a flaps or slats in an aircraft wing, an oil rig boom, a vehicle suspension system.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. An assembly comprising a centre seeking actuator, the centre seeking actuator comprising:
    an outer cylinder;
    a slave cylinder slidably disposed within the outer cylinder;
    a rod assembly having a piston slidably disposed within the slave cylinder and a rod extending from the piston to a point outside the outer cylinder;
    one or more first dynamic seals arranged to act on a sidewall of the rod to inhibit working fluid leaking from the outer cylinder; and
    one or more second dynamic seals arranged to act on a sidewall of the slave cylinder to inhibit working fluid leaking from the outer cylinder, the one or more second dynamic seals being mounted on an inner wall of the outer cylinder;
    wherein the centre seeking actuator is configured to bias a first part of the assembly to assume a predetermined position relative to a second part of the assembly, the assembly being arranged, in use, to force the actuator to assume the first condition when in a first state and having a second state in which the actuator moves the first part of the assembly to assume the predetermined position relative to the second part; and
    wherein the assembly comprises an aircraft landing gear assembly.

2. The assembly according to claim 1, wherein at least some of the sidewall of the slave cylinder that, in use, comes into contact with the second dynamic seals is provided with a coating.

3. The assembly according to claim 2, wherein the coating comprises a high velocity oxygen fuel (HVOF) coating comprising metal, metal alloy, ceramic, plastic or composite materials.

4. The assembly according to claim 2, wherein the coating comprises chrome or tungsten carbide.

5. The assembly according to claim 1, wherein the outer cylinder comprises a first axial face and a second axial face connected by one or more first sidewalls to define a primary chamber, the first axial face having a first through-hole.

6. The assembly according to claim 5, wherein the slave cylinder is slidably disposed within the primary chamber, the slave cylinder comprising a third axial face and a fourth axial face connected by one or more second sidewalls to define a slave cylinder chamber, the third axial face having a second through-hole, the slave cylinder being constrained to move only between first and second extremities within the primary chamber so as to leave at least one free portion of the primary chamber, the outer cylinder including a venting port in fluid communication with the free portion of the primary chamber.

7. The assembly according to claim 6, wherein the piston is slidably disposed within the slave cylinder chamber and the rod can extend though the second and first through-holes so as to project a free end of the rod from the outer cylinder.

8. The assembly according to claim 7, wherein the one or more first dynamic seals are mounted at or adjacent to the first through hole and arranged to act on an external surface of the rod to inhibit working fluid within the chamber passing though the firsts through-hole.

9. The assembly according to claim 7, wherein the one or more second dynamic seals are mounted on the one or more first sidewalls of the outer cylinder and arranged to act on an external surface of the one or more second sidewalls of the slave cylinder to inhibit working fluid within the chamber passing to the free portion of the primary chamber.

10. The assembly according to claim 1, provided with end stops arranged to define the first and second extremities to which the slave cylinder can move.

11. The assembly according to claim 1, wherein the outer cylinder has a length and the one or more second dynamic seals are located closer to the middle of the outer cylinder than to either end of it.

12. The assembly according to claim 1, wherein the first part comprises a bogie beam and the second part comprises a main strut.

13. The assembly according to claim 12, wherein the main strut comprises a main fitting or a sliding tube of a shock absorbing strut.

14. The assembly according to claim 1, wherein the outer cylinder comprises a mounting structure within a sidewall of the outer cylinder and the one or more second dynamic seals are coupled to the mounting structure.

15. The assembly according to claim 1, wherein the one or more second dynamic seals are fixed relative to the outer cylinder.

16. The assembly according to claim 1, wherein the one or more second dynamic seals are free to move relative to the outer surface of the slave cylinder.

\* \* \* \* \*